Nov. 9, 1926.
J. R. VAUGHAN
PIPE
Filed July 24, 1925
1,606,275
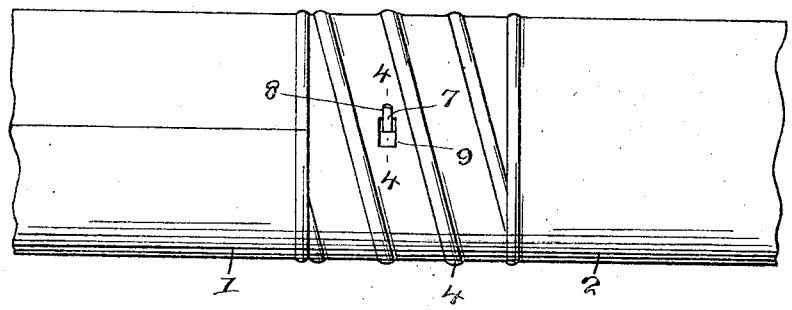
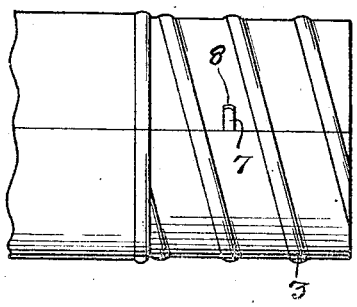 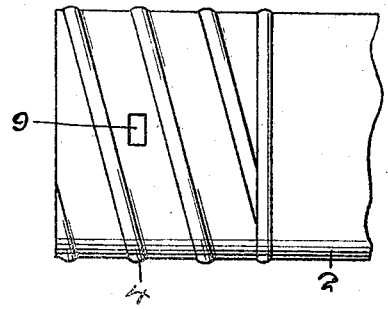
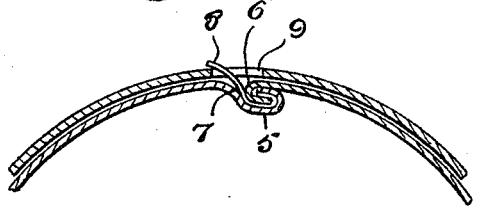 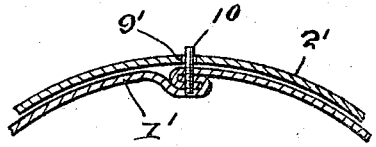
J. R. Vaughan
INVENTOR
BY Victor J. Evans
ATTORNEY
WITNESS:

Patented Nov. 9, 1926.

1,606,275

UNITED STATES PATENT OFFICE.

JOHN R. VAUGHAN, OF AKRON, OHIO.

PIPE.

Application filed July 24, 1925. Serial No. 45,895.

My present invention has reference to pipe members employed as smoke conductors or water or other fluid conductors, and my object is to provide such pipes with interengaging screw ends which have associated therewith simple means for locking the pipe sections connected.

To the attainment of the foregoing broadly stated objects and others which will appear as the nature of the invention is better understood, reference is to be had to the drawing which accompanies and which forms part of this application.

In the drawing:—

Figure 1 is a side elevation of two pipe sections constructed and connected in accordance with this invention.

Figure 2 is a view of the end of one of the pipe sections.

Figure 3 is a view of the cooperating end of the second pipe section.

Figure 4 is an enlarged detail sectional view on the line 4—4 of Figure 1.

Figure 5 is an approximately similar sectional view but showing a modification.

Two pipe sections 1 and 2 respectively have their confronting ends formed with threads 3 and 4 designed for interengagement. The mouth of the pipe section 2 is larger than that of the pipe section 1 so that the end of the said pipe section 2 is screwed over the pipe section 1. The pipe sections are constructed of sheet metal, which sheets, when rounded upon themselves, have their meeting edges connected by interengaging beads 5 and 6 respectively. Between the beads 5 and 6 of the pipe sections 1 I embed one end of a spring plate 7. The outer end of the plate 7 is arched or rounded to provide what I will term a tongue 8. The spring tongue is arranged between the threads 3 of the pipe section 1, while the end of the pipe section 2 between two of the threads therein is formed with a rectangular opening 9. When the pipe section 2 is screwed home on the pipe section 1, the tongue 8 will spring through the opening 9 to engage the walls provided thereby and thus effectively lock the pipe sections assembled.

In Figure 5 of the drawing I have illustrated a slight modification in which the end of the pipe section 2' is provided with an opening 9' through which is inserted a threaded pin 10, the said pin being screwed through an opening in the beaded edges of the pipe section 1'.

Having described the invention, I claim:—

Two pipe sections constructed of sheet metal and each having its confronting edges connected by interengaging beads, each of said sections having threads on the ends thereof, whereby one of said sections may be screwed into the other section, the inner pipe section having a spring member embedded in the beads thereof between the threads thereof and said spring member having a portion projecting outwardly therefrom, and the outer pipe section having an opening between the threads thereof designed to receive therethrough the spring member when the pipe sections are screwed home on each other.

In testimony whereof I affix my signature.

JOHN R. VAUGHAN.